United States Patent
Sutter, IV et al.

(10) Patent No.: US 8,527,866 B2
(45) Date of Patent: *Sep. 3, 2013

(54) MULTI-THREADED SORT OF DATA ITEMS IN SPREADSHEET TABLES

(75) Inventors: Carl B. Sutter, IV, Redmond, WA (US); Anatoly V. Grabar, Redmond, WA (US); Chad B. Rothschiller, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

This patent is subject to a terminal disclaimer.

(21) Appl. No.: 12/771,164

(22) Filed: Apr. 30, 2010

(65) Prior Publication Data
US 2011/0271282 A1  Nov. 3, 2011

(51) Int. Cl.
*G06F 17/00* (2006.01)
(52) U.S. Cl.
USPC .......................................................... 715/212
(58) Field of Classification Search
USPC .......................................................... 715/212
See application file for complete search history.

(56) References Cited

U.S. PATENT DOCUMENTS

| | | | |
|---|---|---|---|
| 5,307,485 A * | 4/1994 | Bordonaro et al. | 1/1 |
| 5,396,621 A * | 3/1995 | MacGregor et al. | 715/809 |
| 5,588,099 A | 12/1996 | Mogilevsky et al. | |
| 5,640,554 A * | 6/1997 | Take | 1/1 |
| 5,794,240 A | 8/1998 | Yamashita | |
| 5,852,826 A * | 12/1998 | Graunke et al. | 1/1 |
| 5,924,093 A * | 7/1999 | Potter et al. | 1/1 |
| 6,055,550 A | 4/2000 | Wallack | |
| 6,115,759 A | 9/2000 | Sugimura | |
| 6,144,986 A * | 11/2000 | Silver | 709/201 |
| 6,457,064 B1 | 9/2002 | Huff et al. | |
| 6,542,920 B1 | 4/2003 | Belkin et al. | |
| 6,626,959 B1 * | 9/2003 | Moise et al. | 715/210 |
| 7,401,313 B2 | 7/2008 | Galatenko | |

(Continued)

FOREIGN PATENT DOCUMENTS

| | | |
|---|---|---|
| CN | 102870088 A | 1/2013 |
| CN | 102918496 A | 2/2013 |

(Continued)

OTHER PUBLICATIONS

Hart, Windows System Programming, 4th Ed., Pearson Education Inc., Feb. 2010, p. 237-243.*

(Continued)

*Primary Examiner* — Frank D Mills
(74) *Attorney, Agent, or Firm* — Merchant & Gould

(57) ABSTRACT

To sort data items in a spreadsheet table, data items in the spreadsheet table are divided into a plurality of blocks. Multiple threads are used to sort the data items in the blocks. After the data items in the blocks are sorted, multiple merge threads are used to generate a final result block. The final result block contains each of the data items in the spreadsheet table. Each of the merge threads is a thread that merges two source blocks to generate a result block. Each of the source blocks is either one of the sorted blocks or one of the result blocks generated by another one of the merge threads. A sorted version of the spreadsheet table is then displayed. The data items in the sorted version of the spreadsheet table are ordered according to an order of the data items in the final result block.

18 Claims, 9 Drawing Sheets

(56) References Cited

U.S. PATENT DOCUMENTS

| | | | |
|---|---|---|---|
| 7,424,668 | B2 | 9/2008 | DeSpain |
| 7,500,179 | B2 | 3/2009 | Lehenbauer et al. |
| 7,533,139 | B2 | 5/2009 | Jones |
| 7,861,060 | B1* | 12/2010 | Nickolls et al. ............ 712/22 |
| 2001/0016855 | A1 | 8/2001 | Hiroshige |
| 2003/0233313 | A1* | 12/2003 | Bartolucci ............... 705/37 |
| 2004/0215939 | A1* | 10/2004 | Armstrong et al. .......... 712/220 |
| 2004/0237029 | A1 | 11/2004 | Medicke et al. |
| 2005/0144167 | A1* | 6/2005 | Yamamoto ................ 707/7 |
| 2006/0031603 | A1 | 2/2006 | Bradfield et al. |
| 2006/0069696 | A1 | 3/2006 | Becker et al. |
| 2006/0224946 | A1 | 10/2006 | Barrett |
| 2007/0136654 | A1 | 6/2007 | Peters |
| 2007/0136655 | A1 | 6/2007 | Peters |
| 2007/0174245 | A1* | 7/2007 | Folting et al. .............. 707/3 |
| 2007/0260667 | A1* | 11/2007 | Duzak et al. ............... 708/521 |
| 2008/0027591 | A1 | 1/2008 | Lenser |
| 2008/0059555 | A1 | 3/2008 | Archer et al. |
| 2008/0184211 | A1 | 7/2008 | Nickolls et al. |
| 2008/0208861 | A1 | 8/2008 | Ray |
| 2009/0049443 | A1 | 2/2009 | Powers |
| 2009/0125907 | A1 | 5/2009 | Wen |
| 2009/0172063 | A1 | 7/2009 | Chirilov |
| 2010/0049445 | A1 | 2/2010 | Fofanov et al. |
| 2010/0058163 | A1 | 3/2010 | Garcia-Molina et al. |
| 2011/0066806 | A1* | 3/2011 | Chhugani et al. ............ 711/118 |
| 2011/0087860 | A1 | 4/2011 | Nickolls et al. |
| 2011/0238677 | A1* | 9/2011 | Kirk et al. ................ 707/752 |
| 2011/0264993 | A1 | 10/2011 | Leong et al. |
| 2011/0276868 | A1 | 11/2011 | Hoke et al. |

FOREIGN PATENT DOCUMENTS

| | | |
|---|---|---|
| CN | 102939580 A | 2/2013 |
| KR | 10-2009-0018097 | 2/2009 |
| WO | 2011/133302 A2 | 10/2011 |
| WO | 2011/136937 A2 | 11/2011 |
| WO | 2011/139528 A2 | 11/2011 |

OTHER PUBLICATIONS

Cole, Parallel Merge Sort, IEEE, 27th Annual Symposium Foundations of Computer Science, Oct. 27-29, 1986, p. 511-516.*

COP 4531—Programming Homework II; published date 2006, 5 pages.

Heineman, George T; May Column: Multi-threaded Algorithm Implementations, Jun. 18, 2009, 12 pages.

Kataria, Puneet; Parallel Quicksort Implementation Using MPI and Pthreads; Dec. 10, 2008, 14 pages.

Microsoft Excel 2010: More on Performance Improvements in Excel 2010, Sep. 8, 2009, 6 pages.

Parallel quicksort: recursion using Boost Bind?; Nov. 8, 2008; 2 pages.

Ray, Robert; An Inside Look at Version 9 and Release 9.1 Threaded Base SAS® procedures; accessed at: http://www2.sas.com/proceedings/sugi28/282-28.pdf; accessed on: Feb. 24, 2010, 6 pages.

Sort Merge Join Algorithm; accessed at: http://www.ibphoenix.com/main.nfs?a=ibphoenix&page=ibp_60_sortmerge_ds; accessed on Feb. 24, 2010, 4 pages.

International Search Report and Written Opinion mailed Nov. 29, 2011.

Capsule: Hardware-Assisted Parallel Execution of Component-Based Programs, accessed at http://hal.archives-ouvertes.fr/docs/00110/31184/Pdf/185_palatin_pierre.pdf, accessed on Feb. 19, 2010, 12 pages.

Improving Performance in Excel 2007, Oct. 2006, 4 pages.

Optimizing Data Storage: Sorting Data, Copyright Feb. 2009, 4 pages.

Hameed, A. "Parallelization of the AAE algorithm," Bachelor of Computing with Honours Thesis, University of Tasmania, Nov. 2007, 76 pages.

Inoue, H. et al., "AA-Sort: A New Parallel Sorting Algorithm for Multi-Core SIMD Processors," 16th International Converence on Parallel Architectures and Compliation Techniques, Brasov, Romania, 2007, 10 pages.

Altman, Jan, "Excel Tips and Tricks," Copyright 2003, 5 pages.

Gainer, David, "Multi-Threaded Calculation in Excel," or "How Calculation Can Become Much Faster in Excel 12," Nov. 3, 2005, 3 pages.

Gold, Mike, "Query Tool to Excel Using C# and .NET," Feb. 3, 2005, 5 pages.

Rosselot, Donald W., "Processing Real-Time Stereo Video in Disparity Space for Obstacle Mapping," Feb. 24, 2005, 66 pages.

International Search Report and Written Opinion mailed Nov. 29, 2011 in Application No. PCT/US2011/030568, 9 pages.

International Search Report and Written Opinion mailed Dec. 23, 2011 in Application No. PCT/US2011/032806, 9 pages.

U.S. Office Action mailed Jun. 12, 2012 in U.S. Appl. No. 12/774,035, 31 pages.

U.S. Office Action mailed Nov. 15, 2012 in U.S. Appl. No. 12/774,035, 33 pages.

U.S. Office Action mailed Mar. 15, 2012 in U.S. Appl. No. 12/766,629, 23 pages.

U.S. Office Action mailed Apr. 23, 2013 in U.S. Appl. No. 12/766,629, 26 pages.

* cited by examiner

MULTI-THREADED SORT OF DATA ITEMS IN SPREADSHEET TABLES

BACKGROUND

Spreadsheet applications enable users to view and manipulate tabular data. For example, a spreadsheet application can enable a user to view and manipulate a spreadsheet table containing rows for different products and columns for different warehouses. In this example, the cells contain values indicating inventories of the products at the warehouses. In many cases, users want to be able to sort the rows in spreadsheet tables. Continuing the previous example, the user may want to sort the rows in the spreadsheet table based on how much a certain warehouse contains of each of the products. In other cases, users want to be able to sort the columns in spreadsheet tables. Continuing the previous example, the user may want to sort the columns in the spreadsheet table based on how much of a certain product is in each of the warehouses.

In large spreadsheet tables, the process of sorting rows in a spreadsheet table can be relatively slow. Such processing delays can disrupt a user's train of thought or discourage the user from sorting the rows in a spreadsheet table. Consequently, it is desirable to make the process of sorting rows in a spreadsheet table as quick as possible.

SUMMARY

A sort process is performed on a spreadsheet table. In the sort process, data items in the spreadsheet table are divided into a plurality of blocks. Multiple threads are used to sort the data items in the blocks. After the data items in the blocks are sorted, multiple merge threads are used to generate a final result block. The final result block contains each of the data items in the spreadsheet table. Each of the merge threads is a thread that merges two source blocks to generate a result block. Each of the source blocks is either one of the sorted blocks or one of the result blocks generated by another one of the merge threads. A sorted version of the spreadsheet table is then displayed. The data items in the sorted version of the spreadsheet table are ordered according to an order of the data items in the final result block.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
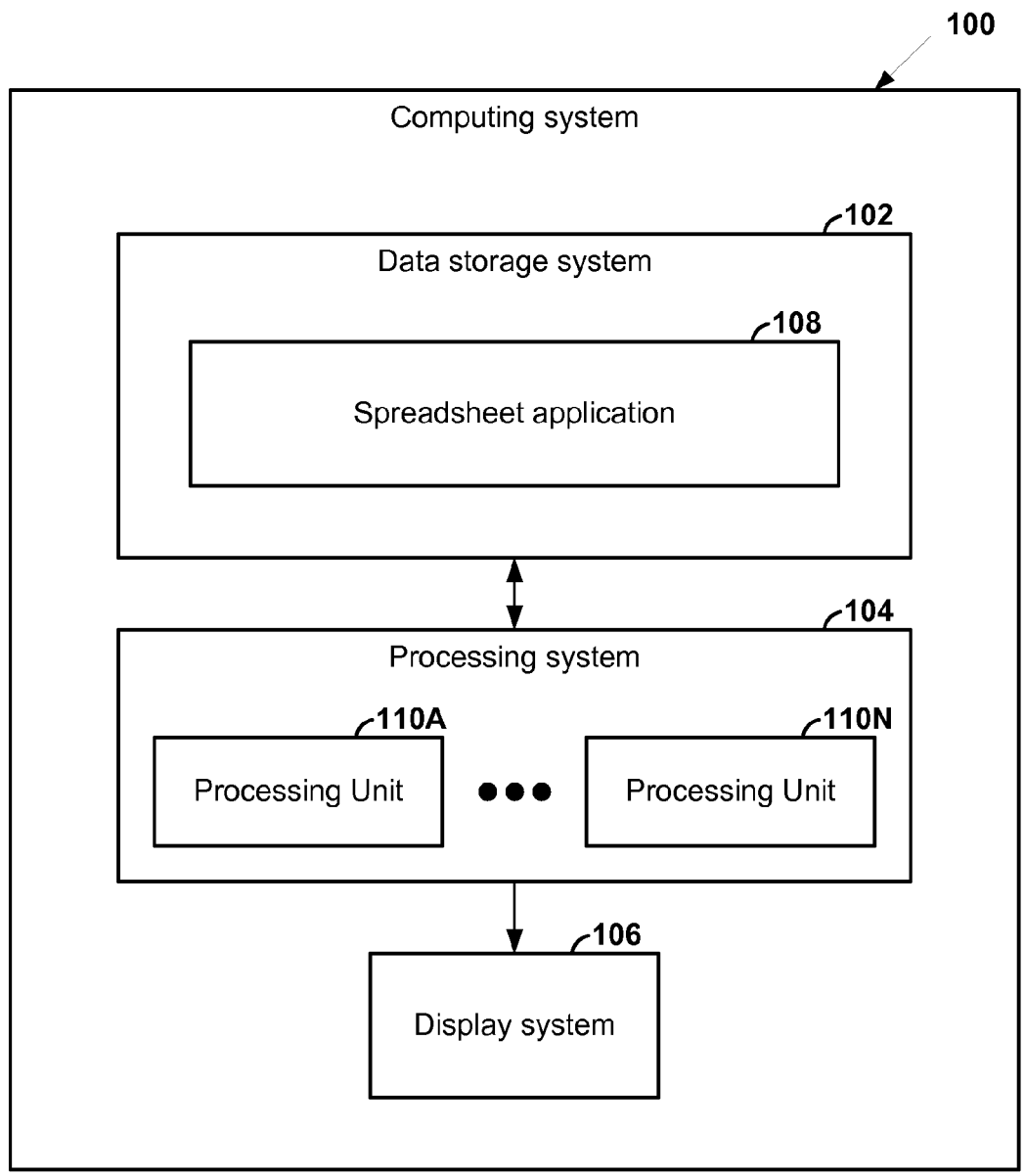
FIG. 1 is a block diagram illustrating an example computing system.

FIG. 1 is a block diagram illustrating an example computing system 100. The computing system 100 is a system comprising one or more computing devices. As used herein, a computing device is a physical, tangible device that processes information. In various embodiments, the computing system 100 comprises various types of computing devices. For example, the computing system 100 can comprise one or more desktop computers, laptop computers, netbook computers, handheld computing devices, smartphones, standalone server devices, blade server devices, mainframe computers, supercomputers, and/or other types of computing devices. In embodiments where the computing system 100 comprises more than one computing device, the computing devices in the computing system 100 can be distributed across various locations and communicate via a communications network, such as the Internet or a local area network.

As illustrated in the example of FIG. 1, the computing system 100 comprises a data storage system 102, a processing system 104, and a display system 106. It should be appreciated that in other embodiments, the computing system 100 includes more or fewer components than are illustrated in the example of FIG. 1. Moreover, it should be appreciated that FIG. 1 shows the computing system 100 in a simplified form for ease of comprehension.

The data storage system 102 is a system comprising one or more computer-readable data storage media. A computer-readable data storage medium is a physical device or article of manufacture that is capable of storing data in a volatile or non-volatile way. In some embodiments, the data storage system 102 comprises one or more computer-readable data storage media that are non-transient. Example types of computer-readable data storage media include random access memory (RAM), read-only memory (ROM), optical discs (e.g., CD-ROMs, DVDs, BluRay discs, HDDVD discs, etc.), magnetic disks (e.g., hard disk drives, floppy disks, etc.), solid state memory devices (e.g., flash memory drives), EEPROMS, field programmable gate arrays, and so on. In some embodiments where the data storage system 102 comprises more than one computer-readable data storage medium, the computer-readable data storage media are distributed across various geographical locations.

The data storage system 102 stores computer-readable instructions representing a spreadsheet application 108. In some embodiments where the data storage system 102 comprises more than one computer-readable data storage medium, the computer-readable instructions representing the spreadsheet application 108 are distributed across two or more of the computer-readable data storage media. In other embodiments where the data storage system 102 comprises more than one computer-readable data storage medium, the computer-readable instructions representing the spreadsheet application 108 are stored on only one of the computer-readable data storage media.

The processing system 104 is a system comprising a plurality of processing units 110A through 110N (collectively, "the processing units 110"). In various embodiments, the processing system 104 comprises various numbers of processing units. For example, the processing system 104 can comprise one, two, four, eight, sixteen, thirty-two, sixty-four, or other numbers of processing units. Each of the processing units 110 is a physical integrated circuit. Each of the processing units 110 is capable of executing computer-readable instructions asynchronously from the other ones of the processing units 110. As a result, the processing units 110 can independently execute computer-readable instructions in parallel with one another. In some embodiments, one or more of the processing units 110 can individually provide two or more logical processing units. Computer-readable instructions can independently operate on the logical processing units and can otherwise act like real processing units.

The display system 106 is a system used by the processing system 104 to display information to a user. In various embodiments, the display system 106 displays information to a user in various ways. For example, in some embodiments, the display system 106 comprises a graphics interface and a monitor.

The processing units 110 in the processing system 104 execute the computer-readable instructions that represent the spreadsheet application 108. The computer-readable instructions that represent the spreadsheet application 108, when executed by the processing units 110, cause the computing system 100 to provide the spreadsheet application 108. The spreadsheet application 108 enables a user to view and manipulate one or more spreadsheet tables. A spreadsheet table is data that is organized as a table having one or more rows and one or more columns. A spreadsheet table can contain various types of data. For example, the tabular data can be sales data, inventory data, military data, billing data, statistical data, population data, demographic data, financial data, medical data, sports data, scientific data, or any other type of sortable data that can be presented in a table.

Cells in a spreadsheet table can contain values having various data types. For example, the values in cells can be integer numbers, real numbers, floating point numbers, alphanumeric text strings, dates, monetary amounts, Boolean values, and so on. In addition to the values in the cells, each of the cells can have a variety of other properties. For example, each of the cells can have a background color property, a font color property, one or more flag properties, a visibility property, a font style property, a font size property, and so on.

The spreadsheet application 108 is able to use multiple threads to perform a sort process on a spreadsheet table. A thread is a portion of a program that can run independently of and concurrently with other portions of the program. The sort process can be performed on rows or columns of the spreadsheet table. For ease of explanation, this document discusses performing the sort operation on rows of the spreadsheet table. However, it should be appreciated that, unless otherwise indicated, discussion in this document of rows is equally applicable with respect to columns. The term "data item" is used in this document to refer generically to either a row or a column.

The sort process sorts the rows in the spreadsheet table. In various instances, the spreadsheet table can be a complete table in a spreadsheet, a portion of a table, or another type of spreadsheet table. Furthermore, in some embodiments, a user of the spreadsheet application 108 selects the spreadsheet table.

Furthermore, in some embodiments, the spreadsheet table can be a pivot table. A pivot table is a spreadsheet table that summarizes one or more other tabular data sets, such as spreadsheet tables, relational database tables, On-line Analytical Processing (OLAP) data cubes, other types of multi-dimensional data sets, and other types of tabular data sets. In some embodiments, a user is able to create a pivot table by selecting a row-label column and a column-label column in a source table. Values in cells in the row-label column become the row labels of the pivot table. Values in cells of the column-label column become the column labels of the pivot table. The value in each pivot table cell is calculated from the values of cells in the column-label column that have the same value as the row label of the pivot table row containing the pivot table cell. A pivot table can also include cells that have values calculated from values in cells of the pivot table. For example, a pivot table can include cells containing totals or counts of values in columns or rows of the pivot table. In some embodiments, users are also able to create pivot tables by selecting rows of the source table instead of columns of the source table.

In some embodiments, the user is able to select two or more row-label columns and a column-label column. In such embodiments, combinations of values in cells of the row-label columns become row labels of rows in the pivot table and values of cells in the column-label column become column labels in the pivot table.

In some embodiments, the spreadsheet table can include hidden rows. A hidden row is a row that is in the spreadsheet table, but is not visible to a user of the spreadsheet application 108. The user can choose to hide particular rows in order to simplify the appearance of the spreadsheet table. In such embodiments, the sort process sorts hidden as well as visible rows in the spreadsheet table.

Sorting rows in the spreadsheet table comprises manipulating an order of the rows in the spreadsheet table such that the rows in the spreadsheet table are properly ordered. The rows in a spreadsheet table are properly ordered when the rows are properly ordered for each sort-by column. A sort-by column is a column in the spreadsheet table on which rows are sorted. In a sort operation on columns, the columns in the spreadsheet table are properly ordered when the columns are properly ordered for each sort-by row. The term "sort-by line" is used in this document to refer generically to a sort-by column or a sort-by row.

Each sort-by column has sorting requirements. The sorting requirements include a relevant property and an ordering relationship. The relevant property can be a variety of different properties of cells in the sort-by column. For example, the relevant property can be the values in the cells, the color of the cells, flags on the cells, colors of fonts in the cells, styles of fonts in the cells, size of fonts in the cells, hidden/visible status of the cells, and other properties of the cells.

An ordering relationship is a set of one or more rules that define how properties are ordered. Example types of ordering relationships include alphabetical ordering, reverse alphabetical ordering, numerical ordering, reverse numerical ordering, chronological ordering, reverse chronological ordering, categorical ordering, geographical ordering, and other types of orderings. As one particular example of a categorical ordering, an ordering relationship may define an ordering over Boolean values by indicating that all true values come before any false values. In another example, an ordering relationship may define an ordering over cell colors by indicating that blue cells come before green cells, yellow cells come before blue cells, red cells come before yellow cells, and so on. In some embodiments, a user of the spreadsheet application 108 is able to select the sort-by columns and the sorting requirements for the sort-by columns.

When there are multiple sort-by columns, the sort-by columns are ranked. The rows in the spreadsheet table are sorted first according to the sorting requirements of highest ranked sort-by column, then according to the sorting requirements of the second-highest ranked sort-by column, and so on. Hence, the rows are properly ordered for a given sort-by column when, for any two rows having the same relevant properties in cells of each higher-ranked sort-by column, the two rows satisfy the sorting requirements of the given sort-by column. The two rows satisfy the sorting requirements of the given sort-by column when an ordering relationship for the given sort-by column holds true for the relevant property of the two cells.

As described in detail elsewhere in this document, the spreadsheet application 108 divides the rows in the spreadsheet table into a plurality of blocks. A block is a set of rows. Hence, a block can be thought of as a smaller spreadsheet table. In some embodiments, the number of rows in each of the blocks is based on the number of rows in the spreadsheet table and the number of processing units 110. At most, the number of blocks is equal to the number of the processing units 110 in the processing system 104.

After the rows are divided into blocks, the sort process enters a block sorting phase. During the block sorting phase, the spreadsheet application 108 uses multiple block sorting threads to sort the rows in the blocks. The number of block sorting threads is equal to the number of blocks. Each of the block sorting threads operates to sort rows in each of the blocks.

After the block sorting threads sort the rows in the blocks, the sort process enters a merging phase. During the merging phase, the spreadsheet application 108 uses multiple merge threads to generate a final result block. The final result block contains each of the rows in the spreadsheet table. The rows in the final result block are properly ordered. Each of the merge threads is a thread that merges two source blocks to generate a result block. Each of the source blocks of a merge thread can either be one of the sorted blocks generated by the block sorting threads or a result block generated by another one of the merge threads. For example, the source blocks of a merge thread can both be sorted blocks generated by the block sorting threads. In another example, the source blocks of a merge thread can be a sorted block generated by one of the block sorting threads and a result block generated by another one of the merge threads. In yet another example, the source blocks of a merge thread can both be result blocks generated by other merge threads.

After the final result block is generated, the spreadsheet application 108 outputs result data for presentation to a user of the spreadsheet application 108. The result data is dependent on an order of the rows in the final result block.

In various embodiments, the spreadsheet application 108 outputs various types of result data. For example, in some embodiments, the spreadsheet application 108 displays a sorted version of the spreadsheet table in which rows in the spreadsheet table are ordered according to an order of the rows in the final result block. Furthermore, in some embodiments, the spreadsheet application 108 generates and displays a report showing at least some rows in the final result block. Furthermore, in some embodiments, the result data does not necessarily include all of the rows in the spreadsheet table. In instances where the result data is consumed by another process or subsets of the spreadsheet table are subject to further sorting, the result data is not necessarily presented to a user.

Figure 2:
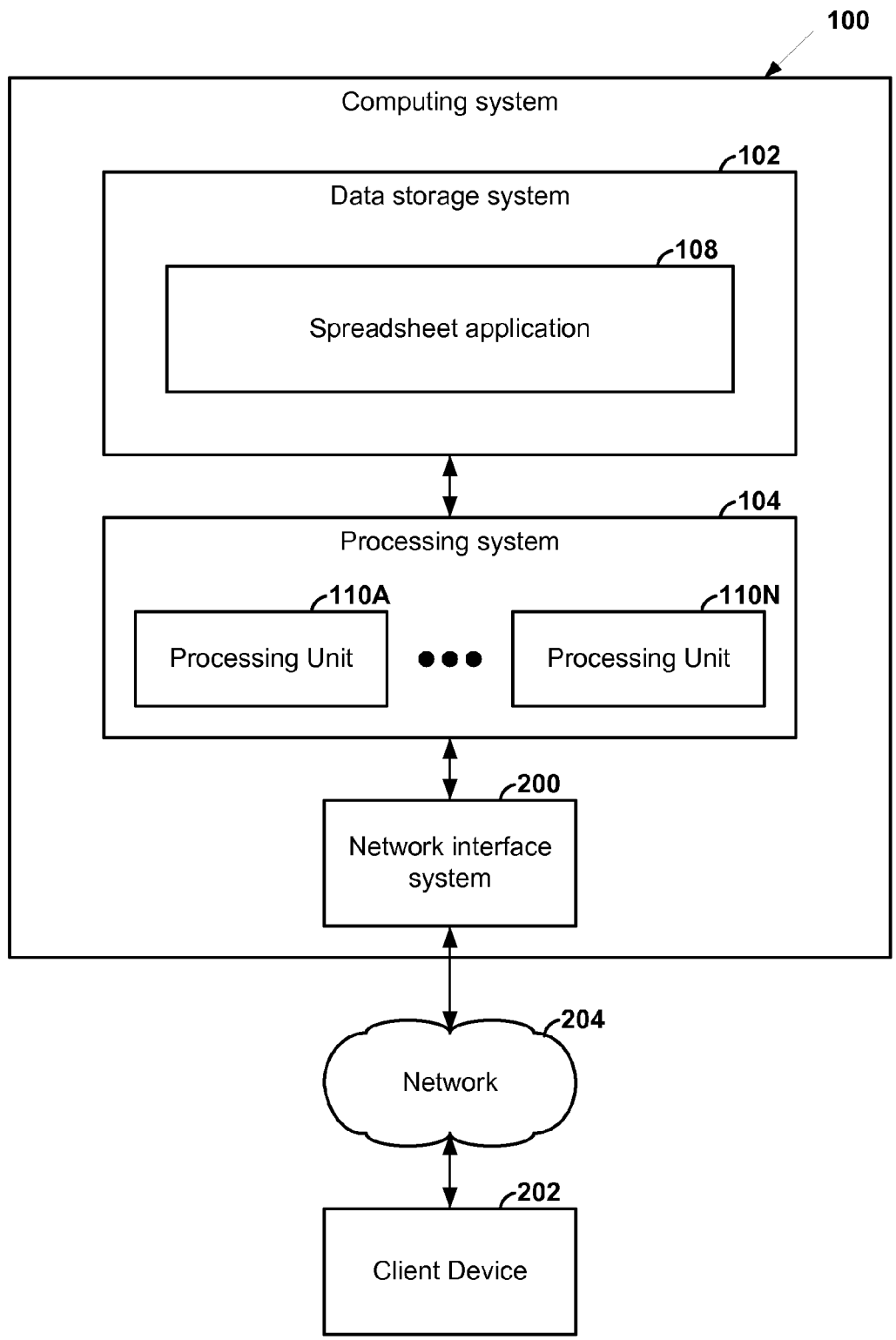
FIG. 2 is a block diagram illustrating an example alternate embodiment of the computing system.

FIG. 2 is a block diagram illustrating an example alternate embodiment of the computing system 100. As illustrated in the example of FIG. 2, the computing system 100 comprises the data storage system 102 and the processing system 104, like in the example embodiment illustrated in FIG. 1. However, unlike the example embodiment illustrated in FIG. 1, the example alternate embodiment of the computing system 100 illustrated in FIG. 2 has a network interface 200 instead of the display system 106.

The network interface system 200 enables the computing system 100 to send and receive data from a client device 202 via a network 204. The network 204 is a communications network comprising computing devices and links that facilitate communication among the computing system 100 and the client device 202. In various embodiments, the network 204 includes various types of computing devices. For example, the network 204 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices. In various embodiments, the network 204 includes various types of links. For example, the network 204 can include wired and/or wireless links. Furthermore, in various embodiments, the network 204 is implemented at various scales. For example, the network 204 can be implemented as one or more local area networks (LANs), metropolitan area networks, subnets, wide area networks (such as the Internet), or can be implemented at another scale.

The client device 202 is a computing device. For example, the client device 202 can be a personal computer used by a user. The user uses the client device 202 to send requests to the computing system 100 and receive information from the computing system 100 via the network 204. In this way, the user can use the client device 202 to view and manipulate tabular data using the spreadsheet application 108. For example, the computing system 100 can send result data to the client device 202 via the network 204. In this example, the client device 202 is configured to process the result data to display a sorted version of the spreadsheet table to a user of the client device 202. For instance, the client device 202 can render a web page containing the result data or interact with a client application to display the result data.

Figure 3:
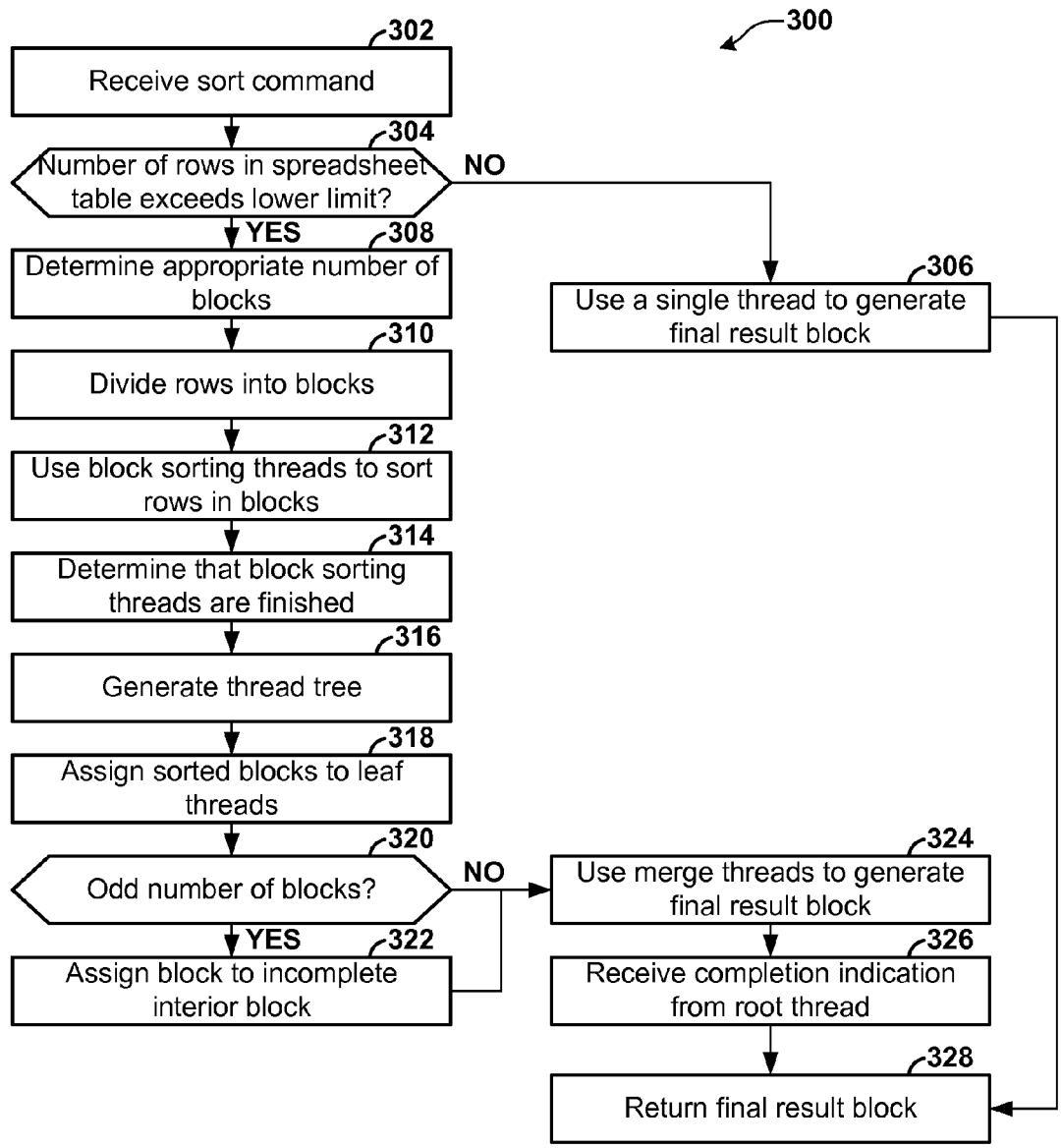
FIG. 3 is a flowchart illustrating an example operation to sort a spreadsheet table.

FIG. 3 is a flowchart illustrating an example operation 300 to sort a spreadsheet table. As illustrated in the example of FIG. 3, the operation 300 begins when the spreadsheet application 108 receives a sort command (302). The sort command instructs the spreadsheet application 108 to start a sort process on a particular spreadsheet table. Furthermore, the sort command can specify a relevant property, a sort-by column in the spreadsheet table, and an ordering relationship. In some embodiments, a user of the spreadsheet application 108 can select the spreadsheet table, the relevant property, the sort-by column, and/or the ordering relationship.

In various embodiments, the spreadsheet application 108 receives the sort command in various ways. For example, in some embodiments, the spreadsheet application 108 receives the sort command when a user of the spreadsheet application selects a particular user interface control of the spreadsheet application 108. Furthermore, in some embodiments, the spreadsheet application 108 receives the sort command when a user enters a particular keyboard command. Furthermore, in some embodiments, the spreadsheet application 108 receives the sort command from another process, thread, or application operating on the computing system 100, the client device 202, or another computing device.

Furthermore, in some embodiments, the spreadsheet application 108 begins the operation 300 without receiving an explicit sort command from a user or another process, thread, or application. For example, in some embodiments, the spreadsheet application 108 can begin the operation 300 automatically on a periodic basis or based on a schedule. Furthermore, in some embodiments, the spreadsheet application 108 can begin the operation 300 automatically when a user updates one or more rows in the spreadsheet table. Furthermore, in some embodiments, the spreadsheet application 108 begins the operation 300 automatically in response to detecting or receiving an event indicating that a change has occurred in a data source from which the spreadsheet table is drawn.

In response to receiving a sort command or otherwise receiving an indication to begin a sort process on a spreadsheet table, the spreadsheet application 108 determines whether the total number of rows in the spreadsheet table exceeds a lower limit (304). In various embodiments, the lower limit has various values. For example, in some embodiments, the lower limit is 255. In other embodiments, the lower limit is greater than 255 or less than 255. In some embodiments, the spreadsheet application 108 presents a user interface that allows an administrative user to set the lower limit. The administrative user can be the user who receives the result data or another user.

If the number of rows in the spreadsheet table does not exceed the lower limit ("NO" of 304), the spreadsheet application 108 uses a single thread to generate the final result block (306). The single thread generates a final result block by sorting the rows in the spreadsheet table such that the rows in the spreadsheet table are properly ordered. Using a single thread to sort the rows can be more efficient than using multiple threads to sort the rows when the number of rows in the spreadsheet table is relatively low. This is because there can be computational penalties (e.g., delays) associated with starting or waking threads. Such computational penalties may only be worth incurring when there are a sufficient number of rows.

If the number of rows in the spreadsheet table exceeds the lower limit ("YES" of 304), the spreadsheet application 108 determines an appropriate number of blocks (308). In various embodiments, the spreadsheet application 108 determines an appropriate number of blocks in various ways. For example, in some embodiments, a minimum job size is the minimum number of rows in a block needed to make starting an additional block sorting thread worthwhile. In some instances, the lower limit is equal to the minimum job size multiplied by two. In this example, if the number of rows in the spreadsheet table divided by the minimum job size is less than or equal to the number of processing units 110 in the processing system 104, the appropriate number of blocks is equal to the number of rows divided by the minimum job size rounded down. For example, if there are 300 rows, the minimum job size is 128, and there are eight processing units in the processing system 104, the appropriate number of blocks is two. If the number of rows in the spreadsheet table divided by the minimum job size is greater than or equal to the number of the processing units 110 in the processing system 104, the appropriate number of blocks is equal to the number of the processing units 110. For example, if there are 30,000 rows, the minimum job size is 128, and there are eight processing units in the processing system 104, the appropriate number of blocks is eight. In some embodiments, the spreadsheet application 108 presents a user interface that allows an administrative user to set the minimum job size.

Next, the spreadsheet application 108 divides the rows in the spreadsheet table into a set of blocks (310). The number of blocks in the set of blocks is equal to the appropriate number of blocks. Each block in the set of blocks contains approximately the same number of rows.

In various embodiments, the blocks are implemented in various ways. For example, in some embodiments, the blocks are implemented as data structures that contain identifiers of rows (e.g., row "513," row "234," row "876," etc.). In such embodiments, inserting rows into a block comprises inserting identifiers of the rows into the block and sorting rows in a block comprises rearranging the identifiers of rows in the block. In other embodiments, the blocks are data structures comprising copies of rows.

After dividing the rows into blocks, the spreadsheet application 108 begins a block sorting phase of the sort process. During the block sorting phase of the sort process, the spreadsheet application 108 uses multiple block sorting threads to sort the rows in the blocks (312). The number of block sorting threads in the set of block sorting threads is equal to the number of blocks in the set of blocks. For example, if the number of blocks is eight, the number of block sorting threads is eight. In some instances, each of the block sorting threads executes in parallel on a different one of the processing units 110 in the processing system 104. The spreadsheet application 108 assigns one of the blocks to each of the block sorting threads. The block sorting threads sort the rows in the blocks assigned to the block sorting threads. In various embodiments, the block sorting threads use various algorithms to sort the rows in the blocks. For example, in various embodiments, the block sorting threads use a quick sort algorithm (e.g., qsort), a bubble sort algorithm, a merge sort algorithm, or another sorting algorithm to sort the rows in the blocks.

At some time after the spreadsheet application 108 wakes the set of block sorting threads, the spreadsheet application 108 determines that the block sorting threads have finished sorting each of the blocks (314). In various embodiments, the spreadsheet application 108 determines that the block sorting threads have finished sorting each of the blocks in various ways. For example, in some embodiments, the block sorting threads provide completion indicators to the spreadsheet application 108 when the block sorting threads finish sorting the blocks. In other embodiments, the block sorting threads store sorted blocks in a buffer. In such embodiments, the spreadsheet application 108 determines that the block storing threads have finished sorting the blocks when the buffer contains a sorted version of each of the blocks.

After the block sorting threads finish sorting the blocks, the block sorting phase of the sort process ends and a merging phase of the sort process begins. During the merging phase of the sort process, the spreadsheet application 108 generates a thread tree (316). The thread tree is a binary tree in which every tier, except possibly a last tier, is completely filled. A binary tree is a tree data structure in which each node has at most two child nodes.

The number of merge threads in the thread tree is equal to the number of blocks minus one. A leaf thread is a merge thread having no child threads in the thread tree. An internal thread is a merge thread having one or more child threads in the thread tree. An incomplete internal thread is an internal thread having only one child thread in the thread tree. A complete internal thread is an internal thread having two child threads in the thread tree. A root thread is a merge thread having no parent threads in the thread tree.

As described elsewhere in this document, a leaf thread operates to merge the sorted blocks assigned to the leaf thread, thereby generating a result block. The result block contains each of the rows in the assigned blocks. The rows in the result block are properly ordered. An incomplete internal thread operates to merge a result block generated by its single child thread with the sorted block assigned to the incomplete internal thread. A complete internal thread operates to merge the result blocks generated by its child threads into larger result blocks. Ultimately, the root thread generates a final result block.

In various embodiments, the spreadsheet application 108 performs various actions to generate the thread tree. For example, in some embodiments, the spreadsheet application 108 generates the thread tree by first identifying available merge threads and/or instantiating merge threads. In this example, the spreadsheet application 108 then generates a pointer data structure that contains an item for each merge thread. The item for a merge thread specifies source pointers and a destination pointer. The source pointers specify memory locations that contain blocks that the merge thread is to merge. The destination pointer specifies a memory location where the merge thread is to store the result block generated by the merge thread. The pointer data structure can be a variety of different types of data structures, including arrays, linked lists, vectors, tables, and so on.

After generating the thread tree or as part of generating the thread tree, the spreadsheet application 108 assigns two of the blocks to each leaf thread in the thread tree (318). In various embodiments, the spreadsheet application 108 assigns blocks to the leaf threads in various ways. For example, in embodiments that use the pointer data structure described above, the spreadsheet application 108 assigns a block to a leaf thread by providing in the item for the leaf thread a source pointer to a memory location of the block. In another example, the spreadsheet application 108 assigns a block to a leaf thread by providing an identifier of the block to the leaf thread as a parameter.

Furthermore, the spreadsheet application 108 determines whether there are an odd number of blocks (320). If there are an odd number of blocks, the thread tree contains an incomplete interior thread. Consequently, if there are an odd number of blocks ("YES" of 320), the spreadsheet application 108 assigns one of the blocks to the incomplete interior thread (322).

After assigning the blocks to the incomplete interior thread or determining that there are not an odd number of blocks ("NO" of 320), the spreadsheet application 108 uses the merge threads to generate the final result block (324). To use the merge threads to generate the final result block, the spreadsheet application 108 wakes the merge threads. In various embodiments, the spreadsheet application 108 wakes the merge threads in various ways. For example, in some embodiments, the spreadsheet application 108 wakes a merge thread by providing a wake event to the merge thread. In other embodiments, the spreadsheet application 108 invokes one or more methods of an operating system interface to wake the merge threads.

Subsequently, the spreadsheet application 108 receives a completion indication from the root thread in the thread tree (326). The completion indication indicates that the root thread has finished generating a final result block. The final result block contains all of the rows in the spreadsheet table. The rows in the final result block are properly ordered.

After the spreadsheet application 108 receives the completion indication from the root thread, or after the rows are sorted in step 306, the spreadsheet application 108 returns the final result block (328). Subsequently, the spreadsheet application 108 can present result data that is dependent on the final result block.

Figure 4:
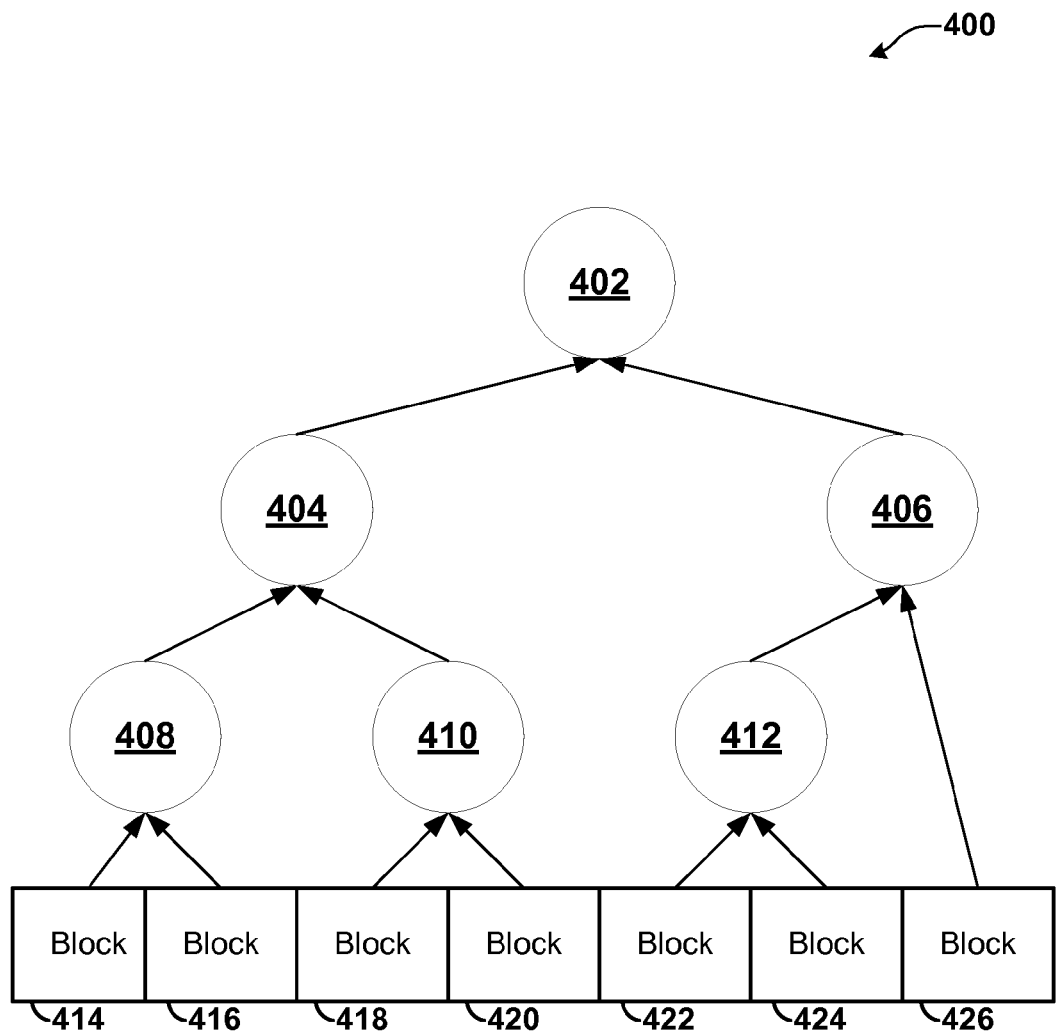
FIG. 4 is a diagram showing an example thread tree.

FIG. 4 is a diagram showing an example thread tree 400. As illustrated in the example of FIG. 4, the thread tree 400 comprises a thread 402, a thread 404, a thread 407, a thread 408, a thread 410, and a thread 412. Thread 402, thread 404, and thread 406 are internal threads. Thread 406 is an incomplete internal thread. Thread 408, thread 410, and thread 412 are leaf threads.

Furthermore, the example of FIG. 4 shows that blocks 414 and 416 are assigned to thread 408, that blocks 418 and 420 are assigned to thread 410, that blocks 422 and 424 are assigned to thread 412, and that block 426 is assigned to thread 406. In other words, blocks 418 and 420 are the source blocks of thread 408. Blocks 418 and 420 are the source blocks of thread 410. Blocks 422 and 424 are the source blocks of thread 412. Block 426 is a source block of thread 406.

Thread 408 merges blocks 414 and 416 to generate a result block. Thread 410 merges blocks 418 and 420 to generate a result block. Thread 412 merges blocks 422 and 424 to generate a result block. Thread 404 merges the result blocks generated by threads 408 and 410 to generate a result block. In other words, the result blocks generated by threads 408 and 410 are the source blocks of thread 404. Thread 406 merges block 426 and the result block generated by thread 412 to generate a result block. In other words, the result block generated by thread 412 is a source block of thread 406. Thread 402 merges the result blocks generated by threads 404 and 406 to generate a final result block. In other words, the result blocks generated by threads 404 and 406 are source blocks of thread 402.

Figure 5:
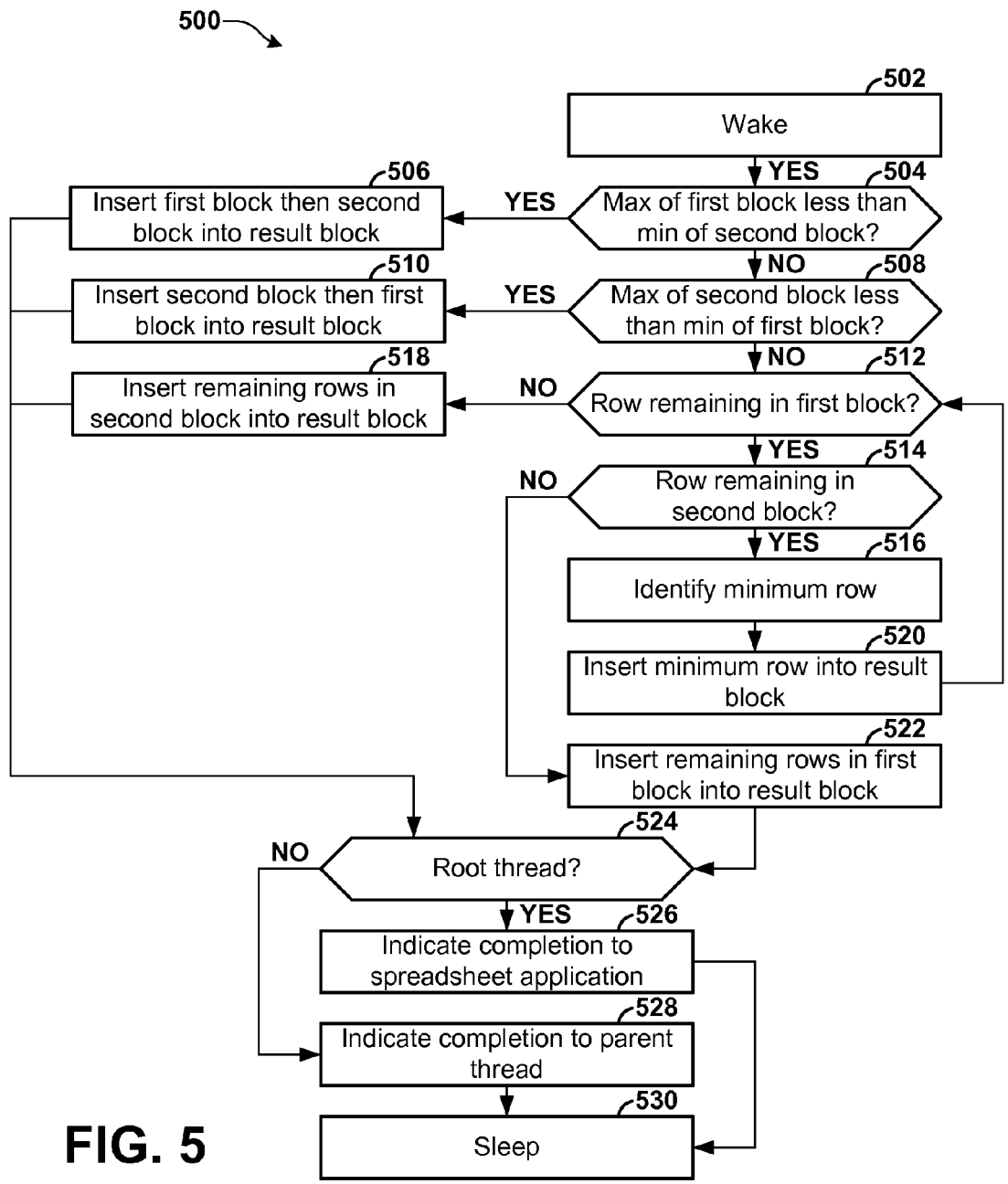
FIG. 5 is a flowchart illustrating an example operation performed by a leaf thread during the merging phase of a sort process.

FIG. 5 is a flowchart illustrating an example operation 500 performed by a leaf thread during a merging phase of a sort process. Although the operation 500 is explained with regard to a single leaf thread, each leaf thread in the thread tree can perform the operation 500. As illustrated in the example of FIG. 5, the operation 500 begins when the leaf thread is woken by the spreadsheet application 108 (502). Waking a thread is the process of getting a thread ready to be run. In various embodiments, the spreadsheet application 108 wakes the leaf thread in various ways. For example, in some embodiments, the spreadsheet application 108 maintains references to sleeping threads that are able to perform the operation 500. In some embodiments, the sleeping threads can include the block sorting threads used in the block sorting phase of the sort process. In other words, one of the block sorting threads can act as the leaf thread. To wake the leaf thread, the spreadsheet application 108 provides a wake event to a thread that can perform the operation 500 and provides to the leaf thread a reference to a first block assigned to the leaf thread and a second block assigned to the leaf thread.

After the leaf thread wakes, the leaf thread determines whether the largest row in the first block is smaller than the smallest row in the second block (504). Because the rows in the first block are properly ordered, the largest row in the first block is the last row in the first block. Because the rows in the second block are properly ordered, the smallest row in the second block is the first row in the second block. If the leaf thread determines that the largest row in the first block is smaller than the smallest row in the second block, there is no overlap between the first block and the second block and there is no need to compare individual rows in the first block and the second block. Rather, if the leaf thread determines that the largest row in the first block is smaller than the smallest row in the second block ("YES" of 504), the leaf thread inserts the first block at the small end of the result block and inserts the second block at the large end of the result block (506). In this way, the result block contains all of the rows in the first block and second block and the rows in the result block are properly ordered.

If the leaf thread determines that the largest row in the first block is not smaller than the smallest row in the second block, the leaf thread determines whether the largest row in the second block is less than the smallest row in the first block (508). Because the rows in the second block are properly ordered, the largest row in the second block is the last row in the second block. Because the rows in the first block are properly ordered, the smallest row in the first block is the first row in the first block. If the leaf thread determines that the largest row in the second block is less than the smallest row in the first block ("YES" of 508), the leaf thread inserts the second block at the small end of the result block and inserts the first block at the large end of the result block (510). In this way, the result block contains all of the rows in the first block and the second block and the rows in the result block are properly ordered.

If the largest row in the first block is larger than the smallest row of the second block and the largest row in the second block is larger than the smallest row in the first block, there is some overlap between the first block and the second block. If the leaf thread determines that the largest row in the second block is not smaller than the smallest row in the first block ("NO" of 508), the leaf thread determines whether there are any remaining rows in the first block (512). A row is a remaining row when the row is not already in the result block.

If there are one or more remaining rows in the first block ("YES" of 512), the leaf thread determines whether there are any remaining rows in the second block (516). If there are no remaining rows in the second block, the leaf thread has already inserted all of the rows in the second block into the result block. Consequently, if there are no remaining rows in the second block ("NO" of 516), the leaf thread inserts any remaining rows in the first block into the result block after the largest row in the result block (518). After inserting the remaining rows in the first block into the result block, the result block contains all of the rows in the first block and the second block and the rows in the result block are properly ordered.

If there are one or more remaining rows in the second block ("YES" of 516), the leaf thread identifies a minimum row (520). The minimum row is the smallest of the remaining row in the first block and the second block.

As discussed above, in some embodiments, multiple sort-by columns can be selected. For example, a user can indicate that the spreadsheet table should first be sorted on a "city" column and then on a "date" column. If there are multiple sort-by columns and if the relevant properties in cells in the highest ranked sort-by column of two rows are the same, the min merge thread identifies the minimum row by comparing the relevant properties in cells in the next highest rankest sort-by column of the two rows. If the relevant properties of cells in the next highest ranked sort-by column are the same, the min merge thread identifies the minimum row by comparing the relevant properties in cells of the third highest ranked sort-by column of the two rows. This comparison process continues until there are either no more sort-by columns or until the min merge thread identifies one of the rows as being smaller than the other row. If the relevant properties of cells in all sort-by columns of the two rows are equal, the min merge thread can identify either of the rows as the minimum row.

The leaf thread inserts the minimum row into the result block after the largest row in the result block (522). After inserting the minimum row into the result block, the leaf thread again determines whether there any remaining rows in the first block (512), and so on.

If there are no remaining rows in the first block, the leaf thread has already inserted all of the rows in the first block into the result block. Consequently, if there are no remaining rows in the first block ("NO" of 512), the leaf thread inserts any remaining rows in the second block into the result block after the largest row in the result block (514). After inserting the remaining rows in the second block into the result block, the result block contains all of the rows in the first block and the second block, and the rows in the result block are properly ordered.

After performing any of steps 506, 510, 518, or 522, the leaf thread determines whether the leaf thread is the root thread (524). If the leaf thread is the root thread ("YES" of 524), the leaf thread provides a completion indication to the spreadsheet application 108 (526). The completion indication indicates that the leaf thread has finished merging the first block and the second block. If the leaf thread is not the root thread ("NO" of 524), the leaf thread provides a completion indication to the parent thread of the leaf thread (528). After either proving the completion indication to the spreadsheet application or the parent thread of the leaf thread, the leaf thread sleeps (530).

Figure 6:
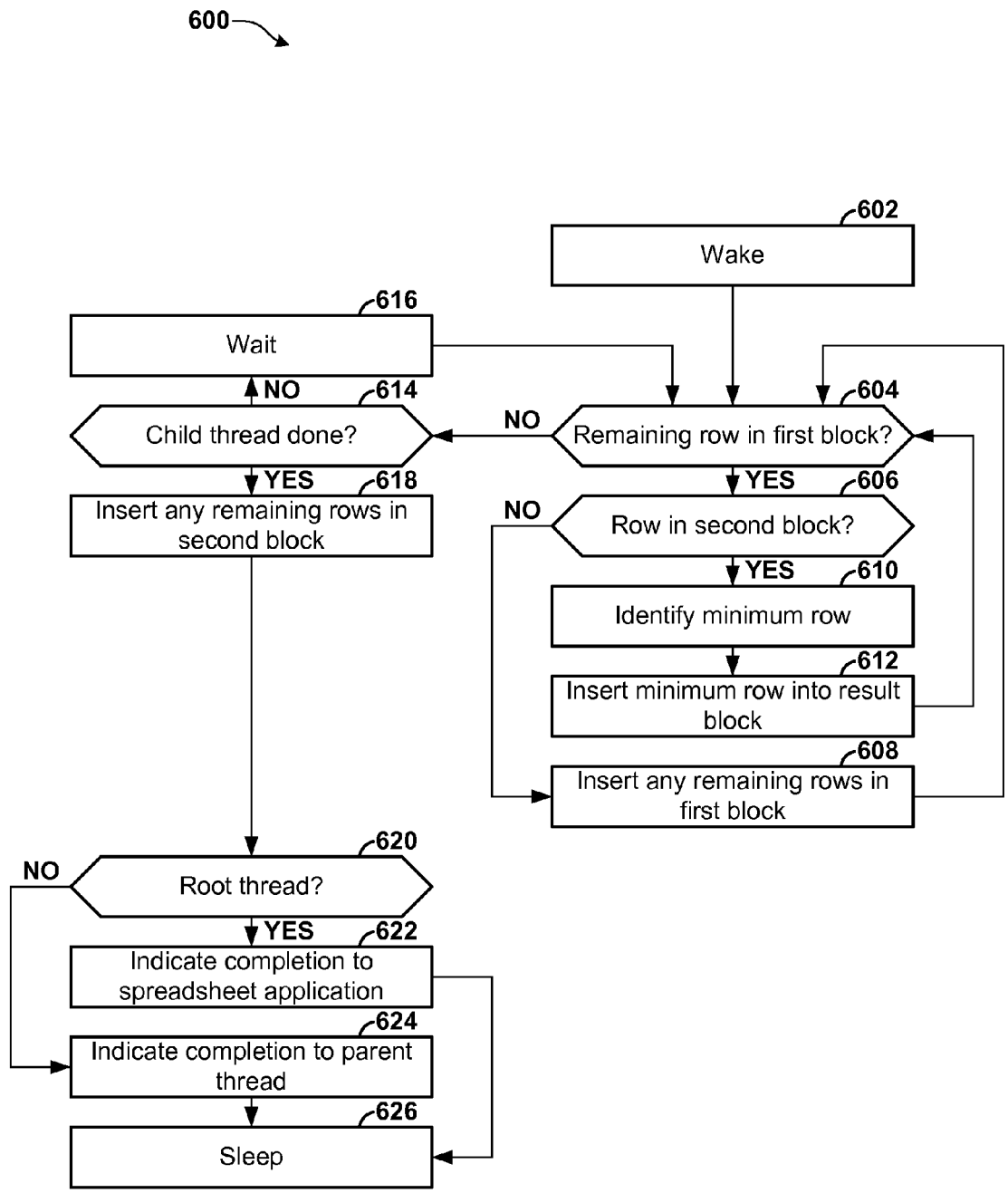
FIG. 6 is a flowchart illustrating an example operation performed by an incomplete interior thread.

FIG. 6 is a flowchart illustrating an example operation 600 performed by an incomplete interior thread. The operation 600 begins when the incomplete interior thread is woken by the spreadsheet application 108 (602). The spreadsheet application 108 provides to the incomplete interior thread a reference to a first block and a second block. The first block is a result block generated by a child thread of the incomplete interior thread. The second block is a block that was produced by one of the block sorting threads during the block sorting phase of the sort process. The incomplete interior thread and the child thread operate concurrently on different ones of the processing units 110. Consequently, the child thread is generating the first block while the incomplete interior thread is performing the operation 600. As a result, there can be times when there are no remaining rows in the first block, but the child thread can later insert more rows into the first block.

After waking, the incomplete interior thread determines whether there are any remaining rows in the first block (604). If there are one or more remaining rows in the first block ("YES" of 604), the incomplete interior thread determines whether there are any remaining rows in the second block (606).

If there are no remaining rows in the second block ("NO" of 606), the incomplete interior thread inserts any remaining rows in the first block into the result block after the largest row in the result block (608). Because the child thread is generating the first block while the incomplete interior thread is performing the operation 600, the child thread can add rows to the first block while the incomplete interior thread is performing the operation 600. The incomplete interior thread is not assured that the child thread will not add any additional rows to the first block until the child thread provides a completion indication to the incomplete interior thread. Consequently, after the incomplete interior thread inserts the remaining rows in the first block into the result block, the incomplete interior thread again determines whether there are any remaining rows in the first block (604), and so on.

If there are one or more remaining rows in the second block ("YES" of 606), the incomplete interior thread identifies a minimum row (610). The minimum row is the smallest remaining row in either the first block or the second block. The incomplete interior thread then inserts the minimum row into the result block after the largest row in the result block (612). After inserting the minimum row into the result block, the incomplete interior thread again determines whether there are any remaining rows in the first block (604), and so on.

If there are no remaining rows in the first block ("NO" of 612), the incomplete interior thread determines whether the child thread is done (614). The child thread is done when the child thread has provided a completion indication to the incomplete interior thread. If the child thread is not yet done, the child thread can still continue to insert rows into the first block. Consequently, if the child thread is not done ("NO" of 614), the incomplete interior thread waits (616). In different embodiments, the incomplete interior thread waits until different events occur. For example, in some embodiments, the incomplete interior thread waits until a timer expires. In other embodiments, the incomplete interior thread waits until a resume event occurs. The resume event can be the insertion of a row into the first block, a completion indication from the child thread, or another type of event. After the incomplete interior thread finishes waiting, the incomplete interior thread again determines whether there are any remaining rows in the first block (604), and so on.

If the child thread is done ("YES" of 614), the incomplete interior thread inserts any remaining rows in the second block into the result block after the largest row in the result block (618). If there are no remaining rows in the second block when the child thread is done, the incomplete interior thread does not insert any rows into the result block at step 618.

After inserting the remaining rows in the second block into the result block, the incomplete interior thread determines whether the incomplete interior thread is the root thread (620). If the incomplete interior thread is the root thread ("YES" of 620), the incomplete interior thread provides a completion indication to the spreadsheet application 108 (622). If the incomplete interior thread is not the root thread ("NO" of 620), the incomplete interior thread provides a completion indication to a parent thread of the incomplete interior thread (624). After either providing a completion indication to the spreadsheet application 108 or the parent thread, the incomplete interior thread sleeps (626).

Figure 7:
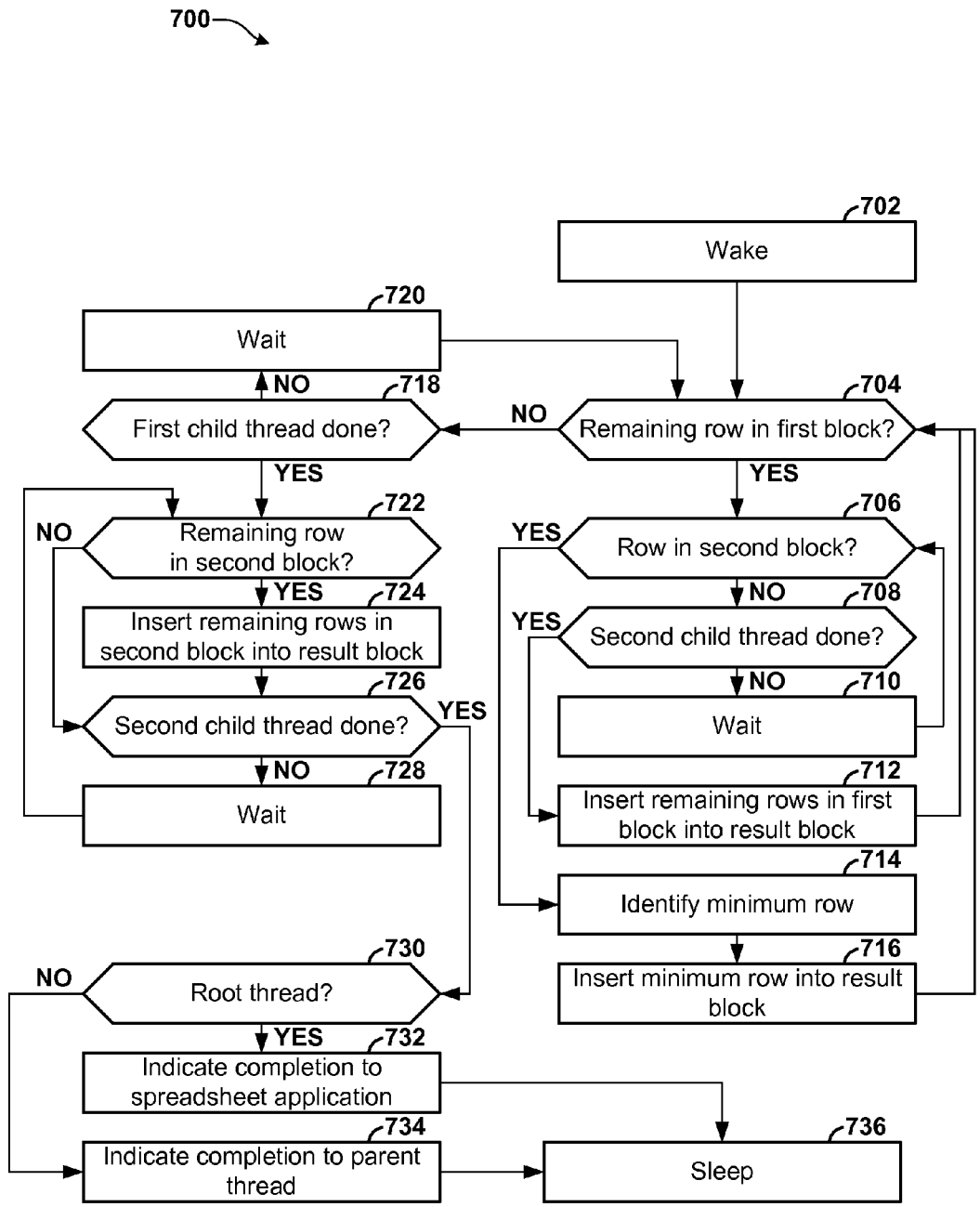
FIG. 7 is a flowchart illustrating an example operation performed by a complete interior thread.

FIG. 7 is a flowchart illustrating an example operation 700 performed by a complete interior thread. Although the operation 700 is explained with regard to a single complete interior thread, each complete interior thread in the thread tree can perform the operation 700. As illustrated in the example of FIG. 7, the operation 700 begins when the complete interior thread is woken by the spreadsheet application 108 (702). The spreadsheet application 108 provides to the complete interior thread interior thread a reference to a first block and a second block. The first block is a result block generated by a first child thread of the complete interior thread. The second block is a result block generated by a second child thread of the complete interior thread. The complete interior thread, the first child thread, and the second child thread operate concurrently on different ones of the processing units 110. Consequently, the first child thread is generating the first block and the second child thread is generating the second block while the complete interior thread is performing the operation 700. Furthermore, because the complete interior thread and the first child thread operate concurrently, there can be times when the first block does not contain any remaining rows, but the first child thread can later insert more rows into the first block Likewise, because the complete interior thread and the second child thread operate concurrently, there can be times when the second block does not contain any remaining rows, but the second child thread can later insert more rows in the second block.

After waking, the complete interior thread determines whether there are any remaining rows in the first block (704). If the complete interior thread determines that there are one or more remaining rows in the first block ("YES" of 704), the complete interior thread determines whether there are any remaining rows in the second block (706).

If there are no remaining rows in the second data block ("NO" of 706), the complete interior thread determines whether the second child thread is done (708). The second child thread is done if the second child thread has provided a completion indication to the complete interior thread. If the second child thread is not done, the second child thread could insert additional rows into the second block. Some of these rows could be smaller than the smallest row in the first block. Hence, if the complete interior thread determines that the second child thread is not done ("NO" of 708), the complete interior thread waits (710). In different embodiments, the complete interior thread waits until different events occur. For example, in some embodiments, the complete interior thread waits until a timer expires. In other embodiments, the complete interior thread waits until the complete interior thread receives a resume event. The resume event can indicate that the second thread has inserted a row into the second block or that the second thread is done. After the complete interior thread has finished waiting, the complete interior thread again determines whether the second block includes any rows (706), and so on.

If the second child thread is done, the second child thread will not insert any more rows into the second block and there are no remaining rows in the second block. Consequently, all remaining rows in the first block are larger than any row in the result block. Hence, if the complete interior thread determines that the second child thread is done ("YES" of 708), the complete interior thread inserts any remaining rows in the first block into the result block after the largest row in the result block (712). After inserting the remaining rows in the first block into the result block, the complete interior thread again determines whether there are any remaining rows in the first block (704), and so on.

If the complete interior thread determines that there is a remaining row in the second block ("YES" of 706), the complete interior thread identifies a minimum row (714). The minimum row is the smallest remaining row in either the first block or the second block. The complete interior thread then inserts the minimum row into the result block after the largest row in the result block (716). After inserting the minimum row into the result block, the complete interior thread again determines whether there are any remaining rows in the first block (704), and so on.

If there are no remaining rows in the first block ("NO" of 704), the complete interior thread determines whether the first child thread is done (718). The first child thread is done when the first child thread has provided a completion indication to the complete interior thread. If the first child thread is not yet done, the first child thread can continue to insert rows into the first block. Consequently, if the first child thread is not done ("NO" of 718), the complete interior thread waits (720). In different embodiments, the complete interior thread waits until different events occur. For example, in some embodiments, the complete interior thread waits until a timer expires. In other embodiments, the complete interior thread waits until a resume event occurs. The resume event can be the insertion of a row into the first block, a completion indication from the first child thread, or another type of event.

If the first child thread is done ("YES" of 718), the complete interior thread determines whether there are any remaining rows in the second block (722). If there are one or more remaining rows in the second block ("YES" of 722), the complete interior thread inserts any remaining rows in the second block into the result block after the largest row in the result block (724). The complete interior thread can insert the remaining rows in the second block into the result block because the first child thread will not add any more rows to the first block and all rows in the first block have been added to the result block. Hence, any remaining rows in the second block are larger than the largest row in the result block.

After inserting any remaining rows in the second block into the result block or after determining that there are no remaining rows in the second block ("NO" of 722), the complete interior thread determines whether the second child thread is done (726). If the complete interior thread determines that the second thread is not done ("NO" of 712), the complete interior thread waits (728). After the complete interior thread is finished waiting, the complete interior thread again determines whether there are any remaining rows in the second block (722), and so on.

If the complete interior thread determines that second child thread is done ("YES" of 726), the complete interior thread determines whether the complete interior thread is the root thread (730). If the complete interior thread is the root thread ("YES" of 730), the complete interior thread provides a completion indication to the spreadsheet application 108 (732). If the complete interior thread is not the root thread ("NO" of 730), the complete interior thread provides a completion indication to the parent thread of the complete interior thread (734). After either providing the completion indication to the spreadsheet application 108 or the parent thread of the complete interior thread, the complete interior thread sleeps (736).

Figure 8:
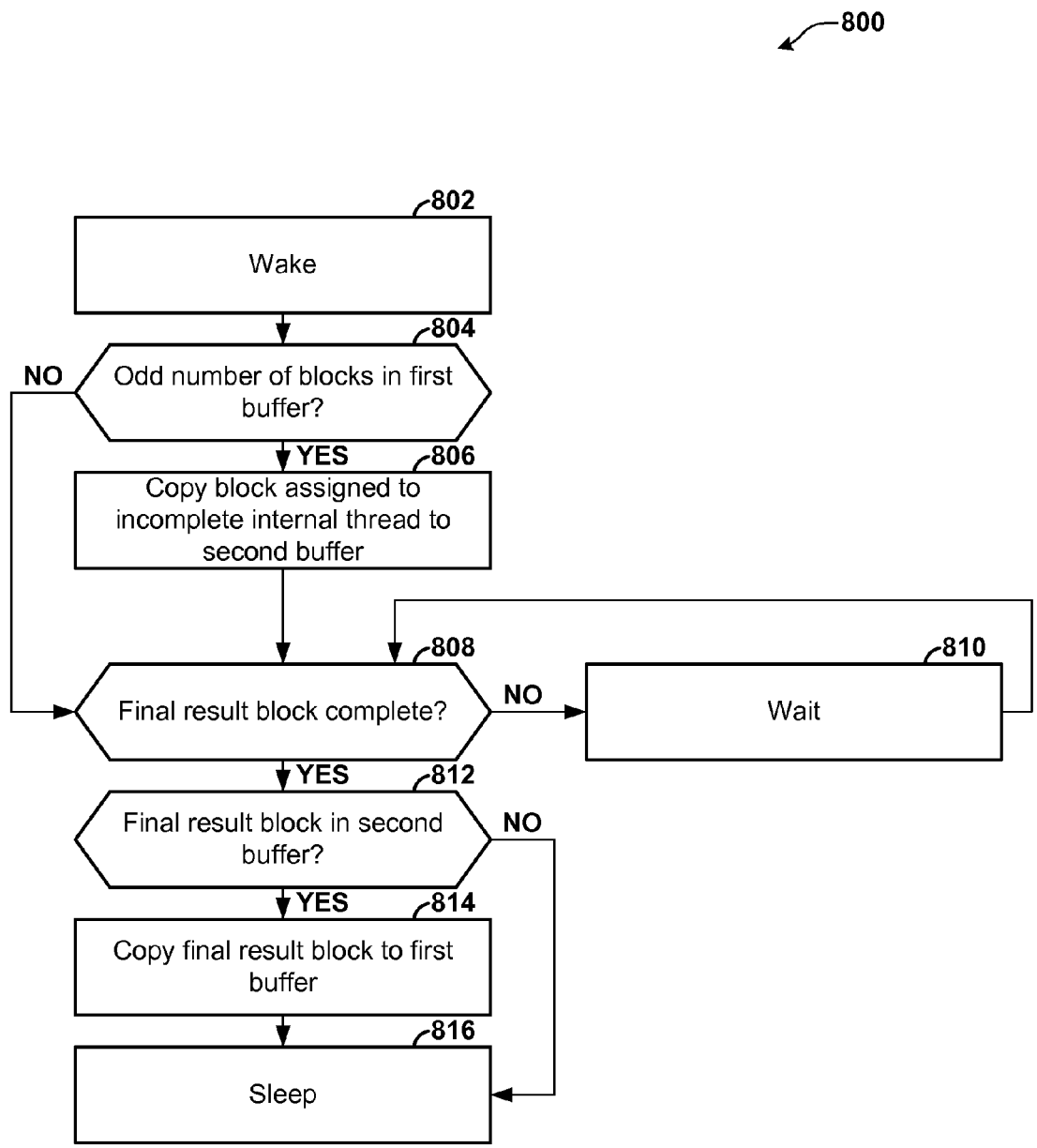
FIG. 8 is a flowchart illustrating an example operation performed by a memory management thread during the merging phase of the sort process.

FIG. 8 is a flowchart illustrating an example operation 800 performed by a memory management thread during the merging phase of the sort process. Some embodiments employ a memory management technique that involves two buffers. In such embodiments, each of the sorted blocks generated during the block sorting phase are stored in the first buffer. For example, blocks 414, 416, 418, 420, 422, 424, and 426 illustrated in the example of FIG. 4 are stored in the first buffer. When the leaf threads generate result blocks, the leaf threads read from the first buffer and store their result blocks in the second buffer. For example, threads 408, 410, and 412 illustrated in the example of FIG. 4 store their result blocks in the second buffer. Internal threads in a first tier above the leaf threads read rows from the second buffer and store their result blocks back into the first buffer. For example, threads 404 and 406 illustrated in the example of FIG. 4 read from the second buffer and store their result blocks into the first buffer. Internal threads in the second tier above the leaf threads read rows from the first buffer and store result blocks back into the second buffer. For example, thread 402 illustrated in the example of FIG. 4 reads from the first buffer and stores its result block in the second buffer. This continues for progressively higher tiers in the thread hierarchy. In some circumstances, this memory management technique can be more efficient than allocating blocks of memory for individual result blocks.

In some embodiments employing this memory management technique, the spreadsheet application 108 expects the final result block to be in the first buffer. However, in some instances, the final result block is in the second buffer rather than the first buffer. Furthermore, in some embodiments employing this memory management technique, all merge threads in a given tier expect to read from the same buffer and store their result blocks in the same buffer. However, an incomplete interior thread reads a block produced by leaf threads (i.e., a block in the second buffer) and a block generated during the block sorting phase (i.e., a block in the first buffer). The memory management thread performs the operation 800 to correct these issues.

As illustrated in the example of FIG. 8, the operation 800 begins when the memory management thread is woken by the spreadsheet application (802). After waking, the memory management thread determines whether there are an odd number of sorted blocks generated during the block sorting phase of the sort process (804). If there are an odd number of blocks in the first buffer, the thread hierarchy includes an incomplete internal thread. Consequently, if there are an odd number of blocks in the first buffer ("YES" of 804), the memory management thread copies to the second buffer a block assigned to the incomplete internal thread (806). In this way, the block is ready for use by the incomplete internal thread.

After copying the block to the second buffer or after determining that there are not an odd number of blocks generated in the block sorting phase of the sort process ("NO" of 804), the memory management thread determines whether the final result block is complete (808). If the final result block is not complete ("NO" of 808), the memory management thread waits (810). In different embodiments, the memory management thread waits until different events occur. For example, in some embodiments, the memory management thread waits until a timer expires. In other embodiments, the memory management thread waits until the root thread provides a completion indication to the spreadsheet application 108. After the memory management thread is finished waiting, the memory management thread again determines whether the final result block is complete (808).

If the final result block is complete ("YES" of 808), the memory management thread determines whether the final result block is in the second buffer (812). If the final result block is in the second buffer ("YES" of 812), the memory management thread copies the final result block to the first buffer (814). After copying the final result block to the first buffer or after determining that the final result block is already in the first buffer ("NO" of 812), the memory management thread sleeps (816).

Figure 9:
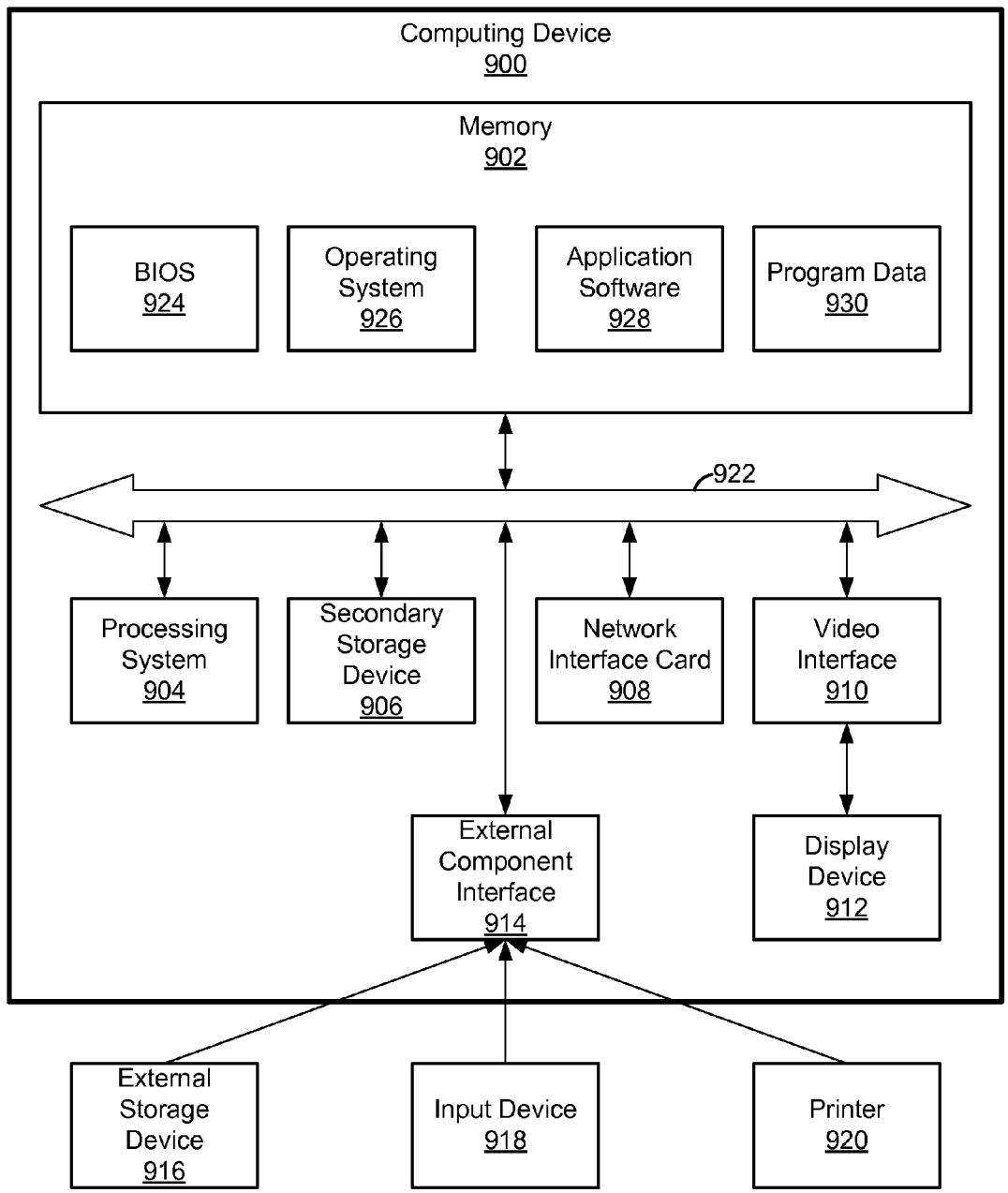
FIG. 9 is a block diagram illustrating an example computing device.

FIG. 9 is a block diagram illustrating an example computing device 900. In some embodiments, the computing system 100 is implemented using one or more computing devices like the computing device 900. It should be appreciated that in other embodiments, the computing system 100 is implemented using computing devices having hardware components other than those illustrated in the example of FIG. 9.

In different embodiments, computing devices are implemented in different ways. For instance, in the example of FIG. 9, the computing device 900 comprises a memory 902, a processing system 904, a secondary storage device 906, a network interface card 908, a video interface 910, a display device 912, an external component interface 914, an external storage device 916, an input device 918, a printer 920, and a communication medium 922. In other embodiments, computing devices are implemented using more or fewer hardware components. For instance, in another example embodiment, a computing device does not include a video interface, a display device, an external storage device, or an input device.

The memory 902 includes one or more computer-readable data storage media capable of storing data and/or instructions. As used in this document, a computer-readable data storage medium is a device or article of manufacture that stores data and/or software instructions readable by a computing device. In different embodiments, the memory 902 is implemented in different ways. For instance, in various embodiments, the memory 902 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 904 includes one or more physical integrated circuits that selectively execute software instructions. In various embodiments, the processing system 904 is implemented in various ways. For instance, in one example embodiment, the processing system 904 is implemented as one or more processing cores. For instance, in this example embodiment, the processing system 904 may be implemented as one or more Intel Core 2 microprocessors. In another example embodiment, the processing system 904 is implemented as one or more separate microprocessors. In yet another example embodiment, the processing system 904 is implemented as an ASIC that provides specific functionality. In yet another example embodiment, the processing system 904 provides specific functionality by using an ASIC and by executing software instructions.

In different embodiments, the processing system 904 executes software instructions in different instruction sets. For instance, in various embodiments, the processing system 904 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 906 includes one or more computer-readable data storage media. The secondary storage device 906 stores data and software instructions not directly accessible by the processing system 904. In other words, the processing system 904 performs an I/O operation to retrieve data and/or software instructions from the secondary storage device 906. In various embodiments, the secondary storage device 906 is implemented by various types of computer-readable data storage media. For instance, the secondary storage device 906 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 908 enables the computing device 900 to send data to and receive data from a computer communication network. In different embodiments, the network interface card 908 is implemented in different ways. For example, in various embodiments, the network interface card 908 is implemented as an Ethernet interface, a token-ring network interface, a fiber optic network interface, a wireless network interface (e.g., WiFi, WiMax, etc.), or another type of network interface.

The video interface 910 enables the computing device 900 to output video information to the display device 912. In different embodiments, the video interface 910 is implemented in different ways. For instance, in one example embodiment, the video interface 910 is integrated into a motherboard of the computing device 900. In another example embodiment, the video interface 910 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 912 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 910 communicates with the display device 912 in various ways. For instance, in various embodiments, the video interface 910 communicates with the display device 912 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 914 enables the computing device 900 to communicate with external devices. In various embodiments, the external component interface 914 is implemented in different ways. For instance, in one example embodiment, the external component interface 914 is a USB interface. In other example embodiments, the computing device 900 is a FireWire interface, a serial port interface, a parallel port interface, a PS/2 interface, and/or another type of interface that enables the computing device 900 to communicate with external components.

In different embodiments, the external component interface 914 enables the computing device 900 to communicate with different external components. For instance, in the example of FIG. 9, the external component interface 914 enables the computing device 900 to communicate with the external storage device 916, the input device 918, and the printer 920. In other embodiments, the external component interface 914 enables the computing device 900 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 900.

The external storage device 916 is an external component comprising one or more computer readable data storage media. Different implementations of the computing device 900 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 918 is an external component that provides user input to the computing device 900. Different implementations of the computing device 900 interface with different types of input devices. Example types of input devices include, but are not limited to, keyboards, mice, trackballs, stylus input devices, key pads, microphones, joysticks, touch-sensitive display screens, and other types of devices that provide user input to the computing device 900. The printer 920 is an external device that prints data to paper. Different implementations of the computing device 900 interface with different types of printers. Example types of printers include, but are not limited to laser printers, ink jet printers, photo printers, copy machines, fax machines, receipt printers, dot matrix printers, or other types of devices that print data to paper.

The communications medium 922 facilitates communication among the hardware components of the computing device 900. In different embodiments, the communications medium 922 facilitates communication among different components of the computing device 900. For instance, in the example of FIG. 9, the communications medium 922 facilitates communication among the memory 902, the processing system 904, the secondary storage device 906, the network interface card 908, the video interface 910, and the external component interface 914. In different implementations of the computing device 900, the communications medium 922 is implemented in different ways. For instance, in different implementations of the computing device 900, the communications medium 922 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 924, an operating system 926, application software 928, and program data 930. The BIOS 924 includes a set of software instructions that, when executed by the processing system 904, cause the computing device 900 to boot up. The operating system 926 includes a set of software instructions that, when executed by the processing system 904, cause the computing device 900 to provide an operating system that coordinates the activities and sharing of resources of the computing device 900. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 928 includes a set of software instructions that, when executed by the processing system 904, cause the computing device 900 to provide applications to a user of the computing device 900. The program data 930 is data generated and/or used by the application software 928.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

We claim:

1. A method comprising:
   dividing data items in a spreadsheet table into a plurality of blocks;
   using multiple threads to sort the data items in the blocks;
   after the data items in the blocks are sorted, using, by a computing system, multiple merge threads to generate a final result block, the final result block containing each of the data items in the spreadsheet table, each of the merge threads being a thread that merges two source blocks to generate a result block, each of the source blocks being either one of the sorted blocks or one of the result blocks generated by another one of the merge threads;
   displaying a sorted version of the spreadsheet table, data items in the sorted version of the spreadsheet table being ordered according to an order of the data items in the final result block; and
   determining an appropriate number of blocks based on a minimum job size and the number of processing units in a processing system, the appropriate number of blocks being equal to a number of rows in the spreadsheet table divided by the minimum job size rounded down when the number of rows divided by the minimum job size is less than or equal to a number of processing units in the computing system.

2. The method of claim 1, further comprising: presenting a user interface that allows an administrative user to set the minimum job size.

3. The method of claim 1, further comprising:
   determining, by the computing system, whether the number of data items in the spreadsheet table exceeds a lower limit; and
   using a single thread to generate the final result block when the number of data items in the spreadsheet table does not exceed the lower limit.

4. The method of claim 1,
   wherein one of the merge threads is an incomplete interior thread when the number of blocks in the plurality of blocks is odd;
   wherein the method further comprises: assigning one of the blocks to the incomplete interior thread;
   wherein the result block generated by the incomplete interior thread contains each of the data items in a result block generated by a child thread of the incomplete interior thread and the block assigned to the incomplete interior thread, the data items in the result block generated by the incomplete interior thread being properly ordered.

5. The method of claim 4, wherein the incomplete interior thread performs at least the following actions:
   determining whether there are any remaining data items in a first block, the first block being the result block generated by the child thread of the incomplete interior thread;
   performing the following actions when there are one or more remaining data items in the first block:
   determining whether there are any remaining data items in a second block, the second block being assigned to the incomplete interior thread;
   performing the following actions when there are one or more remaining data items in the second block:
   identifying a minimum data item, the minimum data item being the smallest of the remaining data items in the first block and the second block;
   inserting the minimum data item into the result block following the largest data item in the result block generated by the incomplete interior thread;
   inserting, when there are no remaining data items in the second block, any remaining data items in the first block into the result block generated by the incomplete interior thread following the largest data item in the result block generated by the incomplete interior thread;
   determining, when there are no remaining data items in the second block, whether the child thread is done;
   waiting, when the child thread is not done, until the child thread adds another data item to the second block;
   inserting, when the child thread is done, any remaining data items in the second block into the result block generated by the incomplete interior thread following the largest data item in the result block generated by the incomplete interior thread.

6. The method of claim 1, wherein the merge thread include a parent thread that starts generating a result block before child threads of the parent thread are finished generating their result blocks, the child threads of the parent thread being other ones of the merge threads.

7. The method of claim 1, wherein the merge threads include a leaf thread that performs the following actions:
   determining whether there are any remaining data items in a first block assigned to the leaf thread, the first block being one of the sorted blocks;

performing the following actions while there are one or more data items in the first block:
determining whether there are any remaining data items in a second block assigned to the leaf thread, the second block being another one of the sorted blocks;
performing the following actions when there are one or more data items in the second block:
identifying a minimum data item, the minimum data item being a smallest of the remaining data item in the first block and the second block;
inserting the minimum data item into a result block generated by the leaf thread after a largest data item in the result block;
inserting, when there are no remaining data items in the second block, any remaining data items in the first block into the result block generated by the leaf thread after the largest data item in the result block generated by the leaf thread;
inserting, when there are no remaining data items in the first block, any remaining data items in the second block into the result block after the largest data item in the result block generated by the leaf thread.

8. The method of claim 7, wherein the leaf thread performs the following actions in response to being woken:
determining whether a largest data item in the first block is smaller than a smallest data item in the second block;
performing, when the largest data item in the first block is smaller than the smallest data item in the second block, at least the following actions without comparing additional data items in the first block and the second block:
inserting the data items in the first block into the result block generated by the leaf thread; and
inserting the data items in the second block into the result block after a largest data item in the result block generated by the leaf thread;
determining whether a largest data item in the second block is smaller than a smallest data item in the first block;
performing, when the largest data item in the second block is smaller than the smallest data item in the first block, at least the following actions without comparing additional data items in the first block and the second block:
inserting the data items in the second block into the result block generated by the leaf thread; and
inserting the data items in the first block into the result block after a largest data item in the result block generated by the leaf thread.

9. The method of claim 1, wherein displaying the sorted version of the spreadsheet table comprises sending result data to a client device via a communications network, the client device configured to process the result data to display the sorted version of the spreadsheet table to a user.

10. The method of claim 1, wherein the spreadsheet table is a pivot table.

11. The method of claim 1, wherein the result data is a version of the spreadsheet table in which the data items in the spreadsheet table are properly ordered.

12. A computing system comprising:
a processing system comprising a plurality of processing units; and
a data storage system comprising computer-readable instructions that, when executed by one or more of the processing units, cause the computing system to:
divide data items in a spreadsheet table into a plurality of blocks;
use multiple block sorting threads to sort the data items in the blocks, wherein the number of the block sorting threads is equal to the number of the blocks;
after the data items in the blocks are sorted, use multiple merge threads to generate a final result block, the final result block containing each of the data items in the spreadsheet table, each of the merge threads being a thread that merges two source blocks to generate a result block, each of the source blocks being either one of the sorted blocks or one of the result blocks generated by another one of the merge threads; and
display a sorted version of the spreadsheet table, data items in the sorted version of the spreadsheet table being ordered according to an order of the data items in the final result block, wherein the merge threads include an incomplete interior thread when the number of blocks in the plurality of blocks is odd, wherein the computer-readable instructions, when executed by one or more of the processing units, further cause the computing system to assign one of the blocks to the incomplete interior thread, wherein the incomplete interior thread generates a result block that contains each of the data items in a result block generated by a child thread of the incomplete interior thread and the block assigned to the incomplete interior thread, the data items in the result block generated by the incomplete interior thread being properly ordered, the child thread being another one of the merge threads.

13. The computing system of claim 12, wherein the computer-readable instructions, when executed by one or more of the processing units, cause the computing system to determine an appropriate number of blocks based on a minimum job size and the number of processing units in the processing system, the appropriate number of blocks being equal to a number of the plurality of processing units in the computing system when a number of rows in the spreadsheet table divided by the minimum job size is greater than or equal to the number of the plurality of processing units in the processing system.

14. The computing system of claim 12, wherein the computer-readable instructions, when executed by one or more of the processing units, cause the computing system to:
determine whether the number of data items in the spreadsheet table exceeds a lower limit; and
use a single thread to generate the final result block when the number of data items in the spreadsheet table does not exceed the lower limit.

15. The computing system of claim 12, wherein the computer-readable instructions represent a spreadsheet application.

16. The computing system of claim 12, wherein the merge threads further include a parent thread that starts generating a result block before child threads of the parent thread are finished generating their result blocks, the child threads of the parent thread being other ones of the merge threads.

17. The computing system of claim 12, wherein the spreadsheet table is a pivot table.

18. A method comprising:
dividing data items in a spreadsheet table into a plurality of blocks;
using multiple threads to sort the data items in the blocks;
after the data items in the blocks are sorted, using, by a computing system, multiple merge threads to generate a final result block, the final result block containing each of the data items in the spreadsheet table, each of the merge threads being a thread that merges two source blocks to generate a result block, each of the source blocks being either one of the sorted blocks or one of the result blocks generated by another one of the merge threads, the merge threads including a leaf thread that performs the following actions:
- determining whether there are any remaining data items in a first block assigned to the leaf thread, the first block being one of the sorted blocks;
- performing the following actions while there are one or more data items in the first block:
- determining whether there are any remaining data items in a second block assigned to the leaf thread, the second block being another one of the sorted blocks;
- performing the following actions when there are one or more data items in the second block:
- identifying a minimum data item, the minimum data item being a smallest of the remaining data item in the first block and the second block;
- inserting the minimum data item into a result block generated by the leaf thread after a largest data item in the result block;
- inserting, when there are no remaining data items in the second block, any remaining data items in the first block into the result block generated by the leaf thread after the largest data item in the result block generated by the leaf thread; and
- inserting, when there are no remaining data items in the first block, any remaining data items in the second block into the result block after the largest data item in the result block generated by the leaf thread; and displaying a sorted version of the spreadsheet table, data items in the sorted version of the spreadsheet table being ordered according to an order of the data items in the final result block.

* * * * *